May 18, 1937.　　W. J. McCORTNEY　　2,080,730
CEMENT
Filed March 1, 1934
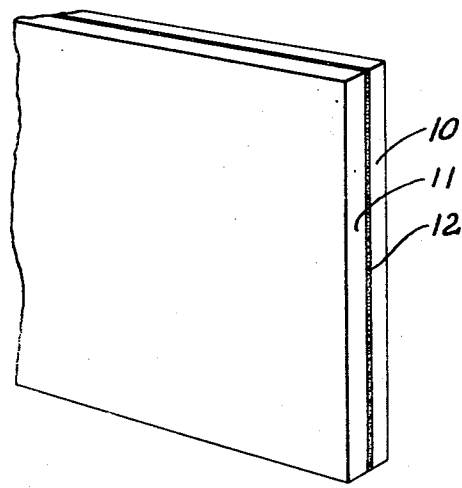
INVENTOR
WILLETT J. McCORTNEY.
BY
Harness, Lind, Patee & Harris
ATTORNEYS Patented May 18, 1937

2,080,730

UNITED STATES PATENT OFFICE 2,080,730

CEMENT

Willett J. McCortney, Royal Oak, Mich., assignor to Chrysler Corporation, Detroit, Mich., a corporation of Delaware Application March 1, 1934, Serial No. 713,510

6 Claims. (Cl. 134—17)

This invention relates to improved cements and to the process of making the same.

One of the main objects of the invention is to provide a cement which, when in a set state, is highly resistant to solvents and capable of withstanding moderately high temperatures.

Another object of the invention is to provide a cement which will adhere tenaciously to surfaces comprising metal, wood, glass, rubber, fabric, fibrous materials, thermoplastics, ceramic substances, and similar materials of construction and ornamentation.

A further object of the invention is to provide a cement which may be applied in the form of a solution having a substantial penetrating capacity.

Other objects of the invention are to provide a cement which, when in a set state, is incapable of undergoing change due to exposure to air or water; to provide a cement of this character which is not dependent upon the application of heat thereto to convert it from an unset to a set state; to provide a water resisting cement which is well suited for interior and exterior applications.

Further objects of the invention are to provide an improved method for deriving from rubber, adhesive materials capable of conversion to a hard set state by exposure to atmosphere at normal room temperature, as well as in the absence of air; and to provide an improved method for making cements having selected physical properties.

An illustrative embodiment of the invention is shown in the accompanying drawing, in which:

Fig. 1 is a fragmentary sectional view diagrammatically illustrating a pair of members secured together by cement embodying the invention.

I have found that the depolymerization products of rubber, when oxidized, either by exposure to air or by oxygen supplied by oxygen carrying oxidizing agents provide a comparatively strong and hard substance which has the main physical properties required of adhesives. The depolymerization may be brought about by the aid of suitable catalyzers. The catalyzers employed for this purpose are preferably those which also serve as catalyzers in promoting the oxidation of the depolymerization products of rubber, the oxygen being derived from the atmosphere from a suitable oxygen bearing oxidizing agent, or from both sources. It is preferable to cause the main portion of the depolymerization and oxidation of the depolymerization products of rubber to occur in situ after the cement has been applied to the parts to be secured together.

There are a vast number of materials which will serve as catalyzers in promoting both depolymerization of rubber and oxidation of the resulting depolymerization products thereof. In the use of such compounds, it is preferable to form an intimate mixture thereof with the rubber. This may be accomplished either by reducing the catalytic agent to a finely comminuted state and incorporating it with the rubber in an internal mixture or by dissolving both the rubber and the catalytic agent in suitable solvents and thoroughly mixing the resulting solutions together. In some instances, the catalytic agent may be dissolved in the solvent and incorporated with undissolved rubber in an internal mixture. It is also desirable to heat the resulting mixture of rubber and the solution of the catalytic agent sufficiently to evaporate the solvent of the latter.

If an oxidizing agent is used, it may be introduced into the mixture at any stage, preferably in a finely divided or dissolved state. The mixture is then thinned to a desired viscosity by dissolving it in a suitable rubber solvent and the resulting cement may be stored in closed containers and applied to surfaces of articles to be secured together in layers of desired thicknesses.

When cements of this character are applied in relatively thin layers upon surfaces of articles to be secured together, the rubber thereof which has been treated in the above manner readily depolymerizes, and the depolymerization products are rapidly converted to hard resinous substances by the oxygen of the atmosphere alone, by oxygen supplied by oxygen bearing oxidizing agents, or by oxygen from both sources. The following are examples of some of the elements and compounds which serve as rubber depolymerization and oxidizing catalyzers, and which are preferably added in powdered form because of their relative insolubility:

Powdered copper (metallic)
Manganese dioxide
Manganous oxide

Some rubber depolymerization and oxidation catalytic agents are soluble in water, examples of which are:

Cupric nitrate
Cupric chloride
Cupric sulfate
Manganous sulfate
Potassium permanganate
Manganese chloride
Manganese perchloride
Sodium manganate
Copper acetate Other rubber depolymerization and oxidation catalytic agents are soluble in ammonium hydroxide, examples of which are:

Cuprous carbonate
Cuprous hydroxide
Cupric phosphate
Cuprous sulfite
Cupric hydroxide
Cuprous sulfide
Cuprous chloride The following are some of the organic compounds which will also function properly as depolymerization and oxidation catalytic agents in the formation of my improved cement:

Benzoyl-peroxide
m-Dinitrobenzene
Manganese acetate
Turpentine

Benzoyl peroxide and m-dinitrobenzene may be introduced in solution in a suitable solvent such as benzene, and the manganese acetate may be dissolved in alcohol prior to incorporation thereof with the rubber.

Certain modifying agents may be introduced into the cement for the purpose of providing it with various specific properties such as a desired degree of tackiness, thickness, and resistance to the action of water and moisture. Bentonite clay has a thickening effect upon the cement and also serves as a coagulation preventative when rubber in the form of latex is employed in the cement. The addition of natural varnish resins, ester gum, and colophony rosin at any stage in the foregoing process adds substantial tackiness to the resulting cement. Water soluble resins may be added to increase the thickness of the cement made from latex or water dispersions of rubber. Aqua resin, gum arabic, gum tragacanth, gum karaya are examples of water soluble resins which may be used for this purpose.

The cement may be readily conditioned during its manufacture to resist the dissolving action of water and moisture by bringing about the formation of a rosinate, preferably of an alkaline earth metal. This may be accomplished by incorporating in an internal mixing machine rubber, colophony rosin, or ester gum, and an oxide or hydroxide of calcium, magnesium or barium. These ingredients are thoroughly mixed together into a plastic mass to which a solution of a depolymerization and oxidation catalytic agent is added. The resulting mixture is heated sufficiently to cause a reaction between some of the rosin and oxide or hydroxide of the metal of the alkaline earth group to occur in the presence of the rubber, and to drive off the solvent of the catalytic solution leaving the catalyzer distributed throughout the mixture. The resulting product may then be dissolved in a suitable solvent such as naphtha, gasoline, benzine, benzoyl, or turpentine to produce a final product of the desired viscosity. The catalyzer may be added at any stage of the process, either before or after the reactions between the rosin and metallic oxide. An agent for oxidizing the depolymerization products of rubber may be added to the above cement at any stage during its manufacture.

When rubber in the form of a latex is used in the preparation of my improved cement, it is desirable to employ one of the water soluble depolymerization and oxidation catalytic agents and to add sufficient quantities of coagulation preventing substances to guard against deposition of the rubber of the latex upon standing. Ammonium hydroxide, animal glue or casein will serve this purpose.

The addition of suitable oxygen bearing oxidizing agents will materially expedite setting of all forms of my improved cement and render it capable of setting and hardening in the absence of exposure to atmosphere particularly when deposited in thin layers from which the solvent has been removed. Numerous oxygen bearing compounds may be used for this purpose, the following being examples of various suitable compounds:

Potassium permanganate
Potassium manganate
Hydrogen peroxide
Turpentine
Sodium peroxide
Barium peroxide
Sodium di-chromate The proportions of the ingredients may be varied within substantially wide limits, but for the purpose of illustration the following examples of specific proportions are set forth. In these illustrations "copper or its compounds" is recited as the depolymerization and oxidation catalytic agent, but it should be understood that any compound or composition which will serve as a catalyzer to promote depolymerization and oxidation of rubber may be used in place of copper or its compounds substantially in the proportions set forth. The solvent called for in each non-aqueous cement formula may be gasoline, benzine, naphtha, or any other suitable rubber solvent, it being understood that water is the solvent to be used in latex, or dispersion cements. Those formulas in which self-contained oxygen is included specify potassium manganate, for the purposes of illustration. Any suitable oxygen bearing oxidizing agent may be used in place of potassium manganate in substantially the proportion set forth.

No. 1.— Parts by weight
Rubber _____ 1000
Copper or its compounds _____ 10 to 100
Solvent (sufficient to produce the desired viscosity).

No. 2.— Parts by weight
Rubber _____ 1000
Copper or its compounds _____ 10 to 100
Potassium permanganate _____ 50 to 200
Solvent (sufficient to produce the desired viscosity).

No. 3.— Parts by weight
Rubber _____ 1000
Resin _____ 1000
Potassium manganate _____ 10 to 200
Copper or its compounds _____ 10 to 100
Solvent (sufficient to produce the desired viscosity).

No. 4.— Parts by weight
Rubber _____ 1000
Resin _____ 1000
Copper or its compounds _____ 10 to 100
Solvent (sufficient to produce the desired viscosity).

No. 5.— Parts by weight
Rubber _____ 1000
Rosin _____ 1000
Lime _____ 45
Copper or its compounds _____ 10 to 100
Solvent (sufficient to produce the desired viscosity).

In place of lime, called for in Formula 5, any hydroxide or oxide of a metal of the alkaline earth group may be used.

*Latex cement*

No. 6.— Parts by weight
Latex (calculated as rubber) _____ 1000
Water soluble copper compound ____ 10 to 100
Sufficient ammonium hydroxide to prevent coagulation of latex.

No. 7.—

| | Parts by weight |
|---|---|
| Latex (calculated as rubber) | 1000 |
| Water soluble copper compound | 10 to 100 |
| Water soluble gum or resin | 1000 |

Sufficient ammonium hydroxide to prevent coagulation of latex.

Any depolymerization and oxidation catalytic agent which is soluble in water may be used in place of the water soluble copper compounds set forth in Formulas 6 and 7 in substantially the same proportions recited therein.

Some compounds, such as manganates and permanganates, particularly the sodium and potassium manganates and permanganates act as catalyzers in promoting depolymerization of rubber and oxidation of the depolymerization products thereof, and also supply the oxygen required for such oxidation reaction.

In the illustration shown in the drawing, a pair of members 10 and 11, comprising either metal, wood, glass, rubber, fabric, fibrous materials, thermoplastics, ceramic substances or similar materials of construction and ornamentation, are secured together by a layer of cement 12 embodying my invention.

Various modifications of the process and of the materials used therein may be resorted to without departing from the spirit of this invention as defined by the following claims.

What I claim is:

1. A cement comprising in its unset state a tacky solution including a substantial quantity of a rosinate of a metal of the alkaline earth group, rosin, rubber, and a rubber depolymerization and oxidation catalyzer.

2. A cement comprising in its unset state a tacky solution including a substantial quantity of a rosinate of a metal of the alkaline earth group, rosin, rubber, a rubber depolymerization and oxidation catalyzer, and an oxidizing agent.

3. A cement comprising in its unset state a tacky solution including calcium rosinate, rosin, rubber, and cupric nitrate.

4. A cement comprising in its unset state a tacky solution including calcium rosinate, rosin, rubber, cupric nitrate, and an oxygen bearing oxidizing agent.

5. A cement comprising in its set state hard in situ formed oxidation and depolymerization products of rubber and an oxidizing agent, an in situ formed rosinate of a metal of the alkaline earth group, rosin and rubber.

6. A cement comprising in its unset state a tacky solution including a substantial quantity of a resinate of a metal of the alkaline earth group, resin, rubber, a rubber depolymerization and oxidation catalyzer, and a rubber solvent.

WILLETT J. McCORTNEY.